Figure 3:
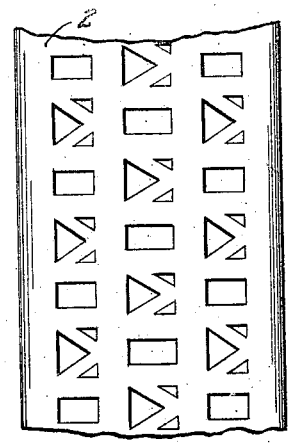

N. J. & F. MOONEY.
RESILIENT TIRE.
APPLICATION FILED JAN. 13, 1916.

1,259,655.

Patented Mar. 19, 1918.

INVENTOR.
NORMAN J. MOONEY
FRANK MOONEY
BY
Carlos P. Griffin
ATTORNEY

UNITED STATES PATENT OFFICE.

NORMAN J. MOONEY AND FRANK MOONEY, OF SAN FRANCISCO, CALIFORNIA.

RESILIENT TIRE.

1,259,655.   Specification of Letters Patent.   Patented Mar. 19, 1918.

Application filed January 13, 1916. Serial No. 71,869.

*To all whom it may concern:*

Be it known that we, NORMAN J. MOONEY and FRANK MOONEY, citizens of the United States, residing at San Francisco, in the county of San Francisco, State of California, have invented a new and useful Resilient Tire, of which the following is a specification in such full and clear terms as will enable those skilled in the art to construct and use the same.

This invention relates to a resilient tire having a suitable spring steel tube forming a portion thereof to give the tire substantially the same resiliency as is given with the use of the ordinary pneumatic tire.

Another object of the invention is to provide a material for the exterior of the tire which will be extremely light and which will have great strength and resistance to wear, a similar though softer material being used adjacent the spring steel tube.

An embodiment of the invention is shown in the drawing in which the same reference numeral is applied to the same portion throughout, but we are aware that there may be many modifications thereof.

Figure 2:
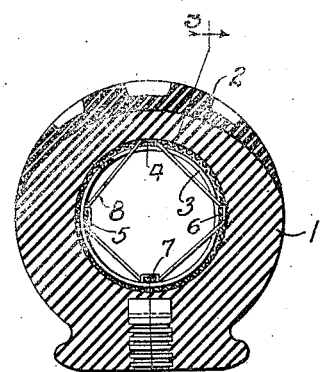
Figure 1:
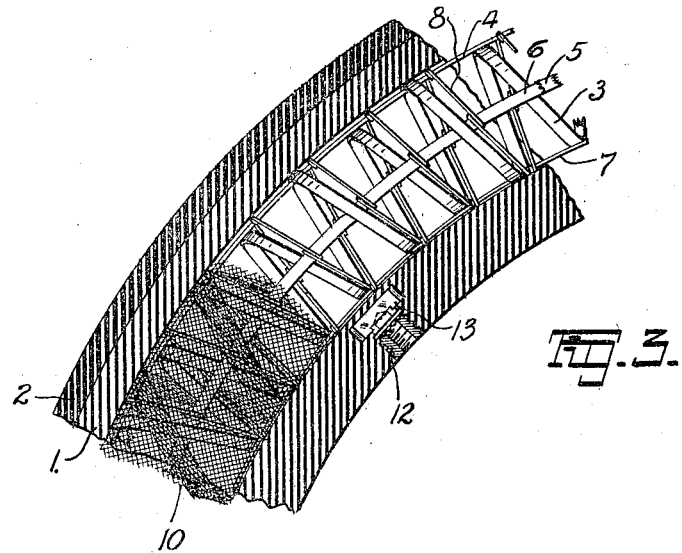

Figure 1 is a plan view of the tread of the tire showing one form of non-skid surface, Fig. 2 is a transverse sectional view through the tire, and Fig. 3 is a sectional view through a portion of the tire illustrating the spring steel cage used therein on the line 3—3, Fig. 2.

The numeral 1 indicates a layer of a soft, tough rubber combination used on the interior of the tire, 2 representing a tougher, harder exterior used for the tread. The tire is formed over a tube consisting of a flat spiral band 3, said band having a plurality of circumferential bands or rings 4, 5, 6 and 7 laced therethrough. The bands 4 and 7 are on the outside and inside respectively of the spiral spring, while the bands 5 and 6 are on opposite sides of the spiral spring. After the spiral spring has had its ends brazed together and the bands 4 to 7 inclusive suitably placed thereon and their ends brazed, a wire 8 is wound around the steel tube thus formed and around the members 4 to 7 inclusive, the object being to prevent the spiral spring 3 becoming displaced from the positions it should occupy with respect to the members 4 to 7 inclusive.

Surrounding the spiral spring thus produced is a wire fabric tape 10, said tape being wound oppositely with respect to the steel band 3 and of sufficient fineness to prevent the rubber compound from passing through into the opposite side of the spiral tube 3. Embedded in the body of the rubber tire in several places are sockets 12 with heads 13 for holding them in place. The sockets 12 are secured to the wheel by suitable bolts which pass through the felly of the wheel and into said sockets for holding the tire in place.

The inner layer of the tire is constructed of a suitably tough grade of rubber vulcanized to the annular tube formed by the spirals and screen tube, which inner layer is covered with a tougher top as indicated at 2, which latter forms the tread.

Having thus described our invention what we claim as new and desire to secure by Letters Patent of the United States, is as follows, express reservation being made of permissible modifications:

1. A resilient tire comprising an annular framework composed of a plurality of flat rings, a flat spiral band interlaced around the flat rings, a wire wrapped around the rings adjacent each convolution of the spiral forming an annular framework, a spirally wrapped wire fabric around the framework thus produced, and a rubber covering vulcanized to the frame for carrying the load.

2. In a resilient tire, a frame comprising a plurality of flat rings, a flat spiral band interlaced with said rings, a wire wrapped around the flat rings and adjacent to the spiral band, a spirally wrapped wire fabric surrounding the spiral band and rings, said wire fabric being wrapped in an opposite spiral from the spiral band, and a rubber covering vulcanized to the frame to provide a wearing surface.

In testimony whereof we have hereunto set our hands this 7" day of January, A. D. 1916.

NORMAN J. MOONEY.
FRANK MOONEY.